Dec. 21, 1954

J. B. WALKER
COMPOUND IMAGE-FORMING REFLECTING
MIRROR OPTICAL SYSTEM 2,697,379

Filed Sept. 16, 1953

INVENTOR.
JOSEPH B. WALKER
BY *Harry R. Lubeke*
AGENT

Dec. 21, 1954

J. B. WALKER 2,697,379

COMPOUND IMAGE-FORMING REFLECTING MIRROR OPTICAL SYSTEM

Filed Sept. 16, 1953

INVENTOR.
JOSEPH B. WALKER
BY
Harry R. Lubcke
AGENT

United States Patent Office 2,697,379
Patented Dec. 21, 1954

2,697,379

COMPOUND IMAGE-FORMING REFLECTING MIRROR OPTICAL SYSTEM

Joseph B. Walker, Los Angeles, Calif.

Application September 16, 1953, Serial No. 380,463

7 Claims. (Cl. 88—24)

My invention relates to image-forming optical systems and particularly to those for combining images of two fields of view.

In the arts of television, motion pictures and still photography it is often desirable to combine scenes from two separate fields of view in a manner as to make it appear that these originated within a single field of view. An example is the apparent placement of actors amid scenes which may have been taken on travelogue photographic expeditions years before. Another is the combination of a commercial object either over or in an otherwise unrelated or at least physically separated scene. Such processes are now of great practical importance in these fields, either resulting in large savings of time and money or in effects that could not otherwise be secured.

Other effects are desirable, but have heretofore been impossible with arrangements of the prior art. By manipulating an adjustment of my system it is possible to cause real people and a full-size station to pull away as these would if viewed through a window in a train which was leaving the station; everything involved in the operation being stationary save the adjustment mentioned. This effect may be controlled at a distance and may increase in apparent speed, as a train would normally accelerate out of a station. By manipulating two adjustments of my system the effect of take-off, landing or air travel can be produced.

Certain arrangements of the prior art have required that one of the scenes to be combined be upside-down in the taking of the motion picture or television scene in order to appear rightside-up in the combined view. This prohibits the combination of a glass containing a liquid or of a cigarette with smoke rising therefrom with a scene containing real people. My system can be arranged to allow these scenes to be properly combined from all objects which are erect in fact.

Furthermore, it has previously been necessary to place the second (miniature) scene within optical arrangements so that actual physical difficulties of manipulation and problems in lighting were encountered. In my system the optics is such that the second scene is outside the optical system, comparatively speaking, and great latitude in lighting and composition of that scene is possible.

In optical combining arrangements two separate types are to be recognized; the additive and the mutually exclusive types. In the former, the combined image light intensity is the sum of the individual light intensities at any given point. In the latter, the combined image light intensity consists of the light intensity of either one image or of the other, but not of both. In the former arrangement one object is sometimes "seen through" another object and in the latter arrangement an object disappears if it moves into the space preempted in the composite scene by the other field of view. These limitations are usually made of no effect by care in production technique, but each arrangement is obviously limited.

In my system it is possible to operate according to either system without modification of the apparatus and it is also possible to operate to any degree between the two systems, securing now effects or providing a greater range in allowable technique so that extended techniques or near accidents, as may occur without recourse in live television, do not cause departures from reality.

The versatility of my system stems from the use of reflective optics rather than refractive, as has long been employed. How these aspects are attained will be set forth in detail hereinafter.

An object of my invention is to provide means for combining two fields of view into a single image, indistinguishable as to its dual character.

Another object of my invention is to provide simple and easily manipulable means for coherently simulating apparent motion of a scene even though the nature of the scene makes genuine motion thereof impossible.

Another object of my invention is to provide optical means for combining two scenes in which both scenes may be outside the constricting confines of the combining optical system.

Another object of my invention is to utilize reflective rather than refractive optics in an optical combining arrangement, thereby eliminating chromatic aberration and attaining manipulative advantages.

Another object of my invention is to provide means by which a real and essentially immovable scene may be framed and changed in apparent position independently of a second scene and of the camera taking the combined scene.

Another object of my invention is to provide an optical combining system over which the camera may be panned, tilted and dollied, the combined scenes acting as a single real scene.

Another object of my invention is to provide an optical combining system in which the placement of each scene and the focus and magnification of the combined image may be electromechanically accomplished by control at a location remote from the system.

Another object of my invention is to provide an optical combining system in which both scenes to be combined stand upright.

Other objects of my invention will become apparent upon reading the following detailed specification and examining the related drawings, in which.

Figure 1:
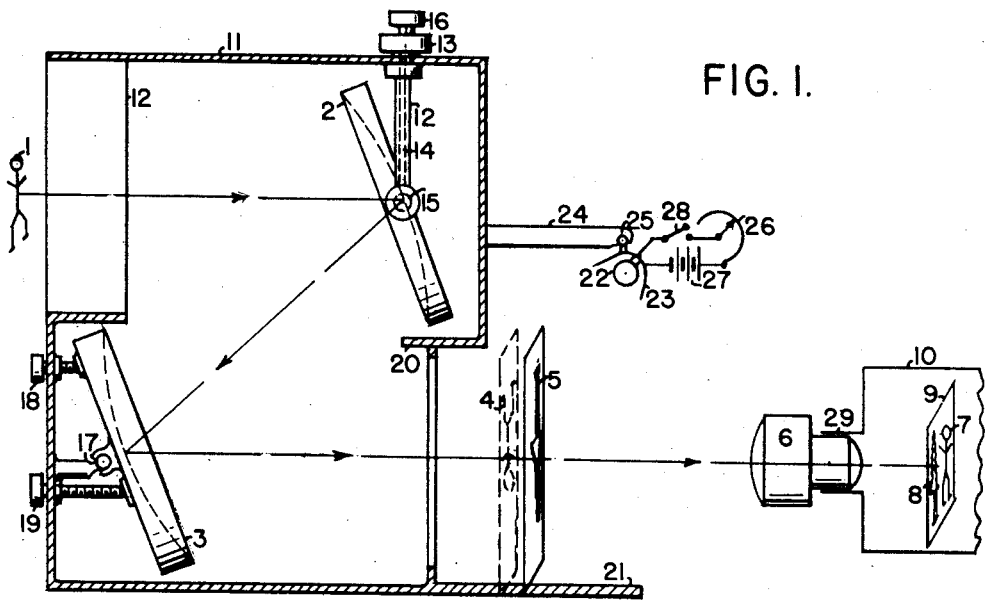
Fig. 1 shows a side elevation view of the essentials of my system.

In Fig. 1, numeral 1 indicates an object in the main field of view, such as an actor. Concave mirrors 2 and 3, conveniently of first-surface glass construction, form a real inverted image 4 of object 1 in space as shown. Slightly further along the optical path a suitably illuminated object or picture 5 is located in an inverted position, a tree in this example. Lens 6 is the objective lens of the television, motion picture or still camera 10. It forms a combined image consisting of the image 7 of the actor and the image 8 of the tree on plane 9; the latter being the photosensitive electron-responsive surface of a television camera tube, an intermittently-progressed motion picture film, a still camera plate or film, or the equivalent.

These essential elements are housed, positioned and adjusted as follows. Numeral 11 identifies the containing case for the mirror elements 2 and 3 of my system. It has a reentrant tunnel portion 12 through which the optical path from the main field of view passes to mirror 2. This prevents extraneous light entering the system. Mirror 2 is adjustable in two dimensions. In Fig. 1 I have shown a manually operated support for this adjustment. It consists of an inverted Y support 12 attached to knob 13, which gives control horizontally. Within that structure is contained a flexible shaft 14 with a pinion engaging gear 15 and the opposite end of the shaft attached to knob 16, which gives vertical control. These are the major controls for positioning the image of the main field of view in the composite image and for producing simulated motion of the first-mentioned image.

Mirror 3 is supported within the optically rigid case 11 upon the universal ball-and-socket joint structure 17. Adjustment screw 18 is attached to mirror 3 with an essentially ball-and-socket connection and is threaded into case 11, so that rotation of the screw gives vertical adjustment to the mirror. In a similar fashion adjustment screw 19 gives horizontal adjustment of mirror 3. These adjustments allow modification of the position of the optical path and the control of minor aberrations.

The optical path leaves the containing case at the lower right-hand portion of it and through some degree of light block 20, included to prevent stray light from impinging upon mirrors 2 and 3. The object 5, of which the second element of the composite image is formed, is supported upon extension 21 of case 11, or the equivalent. The object is illuminated by light source 22, housed in reflector 23 and supported from the case by arm 24, which connects thereto in a ball-and-socket arrangement 25. Additional and other types of illumination may also be utilized, of course, the primary purpose being to illuminate the side of object 5 which faces lens 6. Object 5 may be an actual three-dimensional object, such as any kind of miniature, an article of commerce, a flower or other object held in the hand and demonstrated; as well as the picture of the tree shown which is a cut-out or is supported on a transparent backing which occupies the remainder of the combined image area. Object 5 may also be a semi-transparent painting or representation painted upon glass or other transparent support. In this instance, such portions of image 4 as lie behind the semi-transparent portions of 5 will be reproduced in the composite image at reduced intensity, in amount corresponding to the opacity of the particular area of 5 involved. The combined image will also be altered in appearance according to the relative brightness of the images 4 and 5 and so rheostat 26 is included in the circuit to excite source 22, consisting of battery or electric power source 27 and switch 28. By suitable adjustment of the rheostat the predominance of the scene 5 may be varied, greater illumination thereof giving increased predominance, and by means of switch 28 the scene 5 may be included or essentially removed from the composite image by providing or withholding illumination therefrom. The latter functioning occurs regardless of the nature of object 5. Without illumination and with an opaque object a silhouette thereof is obtained in the combined image.

Camera objective lens 6 is preferably of the medium-angle or medium focal length type and is adjusted in axial position to focus object 5 and simultaneously image 4 upon the working surface 9. This is accomplished by sliding the lens as required in the enclosing portion 29 of camera housing 10, or by equivalent means.

How I achieve the objectives of combining two fields of view, and of combining these relatively free from the restrictive confines of an optical system are now apparent. As to other objects, it is desirable to point out that with reflective optics the position of the image formed is determined by the orientation of the optical surface. This is not true with refractive optics, i. e., with lenses, where a change in the orientation thereof may change the aberrations of the system but will not change the position of the image. Consequently, should lenses be utilized in a device similar to my case 11, the whole case would have to be oriented in order to change the composition of the scene represented by actor 1 in the main field of view. This is a serious disadvantage in practical work.

In motion pictures and particularly in television a rehearsal usually determines where actors and other movables in the scene such as bicycles, autos, tea wagons and so on will be located. It is also axiomatic in these arts that "few performances come off exactly as rehearsed." It is too much to expect that performers who have lines to remember and things to do will be able to occupy exactly their proper positions in the performance without looking for marks on the floor in an obvious manner or otherwise orienting or reorienting themselves for the requirement of proper placement. Such actions destroy the illusion of the play and are never tolerated. In nearly every situation a scene in television is previewed by the cameraman and/or technical control personnel prior to that camera taking over the program. If a simple finger-tip adjustment is available, as my adjustments 13 and 16, the cameraman or a technical assistant can quickly make such readjustment as is required to give the conditions of the rehearsal and a perfection of presentation that is discernible to the audience is the result. With television programs now costing as much as one thousand dollars per minute, versatility of this nature is sought after. Similarly, in motion picture production, the high cost of performers and facilities pays a return to rapid manipulation, absent in other processes where time is much less valuable per unit. The utility, need and method of use of my device in the arts in which it may be used is now apparent, as is the manner in which I achieve other of my stated objectives.

Because the camera 10 in my system is physically separate from the remainder as shown in Fig. 1 and because an image of real object 5 and of real image 4 closely positioned thereto is formed therein it is seen that the camera may be panned, tilted and dollied as desired and the composition of the composite image will remain a coherent whole, thus accomplishing another object of this invention.

I have found that the position of image 4 is relatively the same whether the object 1 be far or near from my reflective optical system 2, 3 within the ranges met in practice. If necessary, the position of object 5 may be adjusted axially with respect to lens 6 so that image 4 and object 5 are within the limits of the depth of focus of lens 6.

Figure 2:
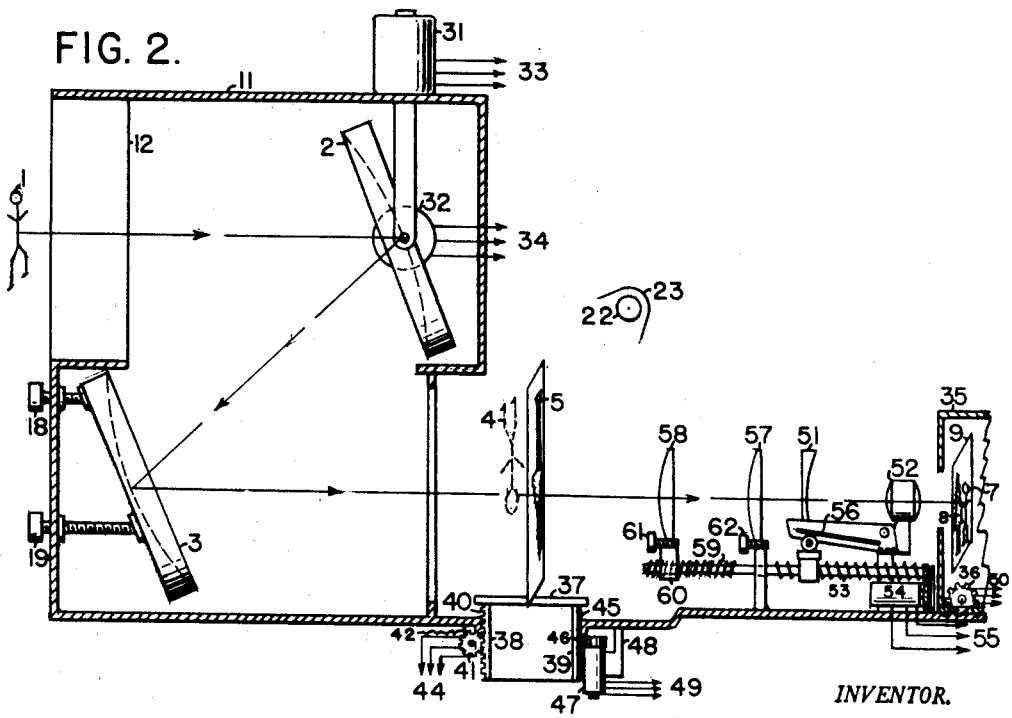
Fig. 2 shows a side elevation view of an alternate embodiment of my system adapted for zoom lens operation and remote control.

Fig. 2 is an elevation view of my system utilizing my Electrazoom lens. This lens per se has been described in my U. S. Patent No. 2,532,685, dated December 5, 1950 in the motor-operated form in which I prefer to use it here. It has been further described in my Patents 2,515,104, July 11, 1950 and 2,547,187, April 3, 1951. In Fig. 2 the essential optical path and the same numbered elements are the same as previously shown in Fig. 1.

An important difference is electrical control of the orientation of mirror 2. This is accomplished by reversible motors 31 and 32, which are each provided with an internal gear train or worm and gear to give very slow rotation to the working shaft in relation to the speed of the armature. Motor 31 accomplishes horizontal change in the image placement and motor 32 accomplishes vertical change. The three wires 33 emanating from motor 31 allow reversal of the direction of rotation thereof when appropriately energized from a remote control and power source not shown but well known in the art. The three wires 34 are equivalent to the above with respect to motor 32. The motors may be of the commutator or polyphase A. C. types. The remote point of control is preferably the operating position of the technical director or equivalent technician in television operation or that of the cameraman or assistant cameraman in motion pictures. The television cameraman may also have control, the wires mentioned merely being extended to the proper operating position.

Another important difference is electrical control of the position of the second object 5. In Fig. 2 the case 11 is affixed to the Electrazoom lens and as a consequence to camera housing 35. In the figure the relative size of case 11 and its contents has been enlarged for clarity with respect to the Electrazoom lens and housing 35; thus, in practice, the whole structure may be unitary without awkwardness. A slow motion motor 36 acting through pinion and rack provides focus between the Electrazoom lens and the working surface 9 of the camera. Wires 50 take control of the motor to the operating location previously described.

Object 5 is mounted upon platform 37, which is constrained by guide portions of the main case bearing upon vertical sides 38 and 39. Side 38 is provided with rack teeth 40, each tooth of which extends nearly all the way horizontally of the side. Gear 41 engages this rack and is operated by a slow motion motor behind it that is fastened to case 11. Wires 44 take control of the motor to the operating location previously mentioned. Similarly, side 39 has vertical teeth 45 which engage gear 46. This is operated by slow motion motor 47 which is fastened to case 11 by bracket 48. Wires 49 take control of this motor to the operating location.

It is seen that by suitable excitation of the motors mentioned object 5 can be given any desired position transverse of the optical axis. Any desired composition of the two fields of view can therefore be accomplished by three means of adjustment. The general field of main view in which object 1 is located may be selected by the cameraman by suitably pointing camera 35, as is usual practice. Further placement of the image of that field of view can be controlled from the remote control location by suitably exciting motors 31 and 32. The relation between images 7 and 8 on surface 9 may be determined by suitably exciting motors 42 and 47 controlling the position of object 5. It will be understood that the original pointing of the camera can be performed prior to the performance, or by a brief effort on the part of a cameraman normally assigned to another camera, the composition of the composite scene being thereafter effected by a control location operator just prior to use.

Turning now to a description of how the Electrazoom lens is adapted to my system, element 51 is the movable diverging lens and 52 is the movable converging lens of the Electrazoom. Lens 51 is translated parallel to the optical axis by threaded worm 53 by reversible motor 54, which is actuated from the control location by means of wires 55. Lens 52 is translated from lens 51 by cam 56 as has been explained in the patents mentioned. Lens 57, normally converging and included in the Electrazoom in order to shorten the focal length, occupies the usual position as shown. Lens 58 is a converging and movable one that I have found desirable in adapting the Electrazoom to this system. Worm 53 is provided with an extension having a thread 59 giving less travel per revolution than that of the original worm. Internally threaded support 60 imparts the motion to the lens. By the opposite hand of the thread of section 59 it is evident that the lens moves toward object 5 when lenses 51 and 52 move together, an action that increases the magnification of the combination of the latter two. The movement of lens 58 accomplishes maintenance of focus of images 7 and 8 on surface 9 of the camera utilizing the normal cam action of the Electrazoom lens. Without lens 58 the cam action would have to be excessive because of the closeness of image 4 and object 5 to the Electrazoom.

With the embodiment of Fig. 2, therefore, it is not only possible to arrange composition of the combined image by remote control but it is possible to zoom to a closeup and vice versa in a similar manner. This motor controlled embodiment of Fig. 2 is also superior for producing simulated motion effects because of the smooth and uniform motion that can be attained in comparison to manual control.

The effect of the viewing audience being upon a train which is pulling out of a station is performed as follows. For object 5 a picture of the window frame with the window portion cut out is used. This may include adjacent details of the inside of the passenger car, if desired. For object 1 the necessary portion of a railroad station and real people are provided. Such action of these performers as may take place while the train is stationary is carried on without excitation of any of the motor controls associated with the reflective optics of my system. When the train is to pull out of that station motor 31 is energized. For this purpose it must be a variable speed motor; of which the A. C.-D. C. commutator universal type, the wound rotor synchronous locked-in system of motion picture camera and sound recording type, and a motor with a variable speed cone-disk or equivalent transmission are examples. The motor is energized feebly at first, then at an accelerated pace to give the impression of acceleration of the railroad train.

In a similar manner an elevator going either up or down can be simulated by accelerated excitation of motor 32 in the appropriate direction. By excitation of both motors 31 and 32 the impression of three dimensional flight can be given. When combined with a zoom from a long shot to a close up by exciting motor 54 a simulated landing of an aircraft can be accomplished and by reversed excitation, a takeoff. By utilizing a picture of an airplane for object 5 it is possible to make it fly across a scene by excitation of motor 47 and to rise or fall by excitation of motor 42. Real objects of miniature size may be mounted upon platform 37 in an inverted manner and thus constitute object 5, as may transparencies, slides and translucent, phosphorescent and self-luminous bodies.

I have found that the focal lengths of the mirrors 2 and 3 are not critical, nor is the spacing thereof. It is only necessary that the combination form a real image approximately in the plane of object 5. I have shown two converging mirrors having concave surfaces and these of different focal lengths; 14 and 20 inches in one practical embodiment. These dimensions and the sum of them are subject to wide variations; one mirror may be plane or even convex as long as the other is of increased concavity so that the combined focal length remains within the norminal limits of the combined focal length required to form the image near object 5. Because of this flexibility I am able to minimize aberrations. It is also possible to form one or both of the mirrors 2 or 3 with aspheric surfaces to minimize aberrations. The cross-sectional curve should tend toward the parabolic.

Finally, I have found that an obliquely positioned lens located upon the optical axis in the position of lens 58 reduces spherical aberration. It is for this reason that lens 58 is provided with an adjusting screw 61 by which the obliquity to the axis may be adjusted. For mirrors 2 and 3 one above the other a vertical tilt of lens 58 is required. With one adjustment of mirror 3 with respect to the optical axis the top of lens 58 is to be inclined toward object 5. With an opposite adjustment of mirror 3 lens 58 is to be oppositely inclined. It is not necessary that lens 58 move in order to accomplish this reduction in aberration; lens 57 may be similarly adjusted by means of adjusting screw 62 or another positive (converging) lens may be included in this region of the optical system for this specific purpose. This method of correction may likewise be applied to the optical system of Fig. 1 by merely including a lens of the nature of adjustable lens 57 of Fig. 2 in the optical path between object 5 and lens 6. These lenses reduce principally spherical aberration, regardless of axial position. Which direction lens 58 moves is determined by the focal lengths of the lenses involved.

Figure 3:
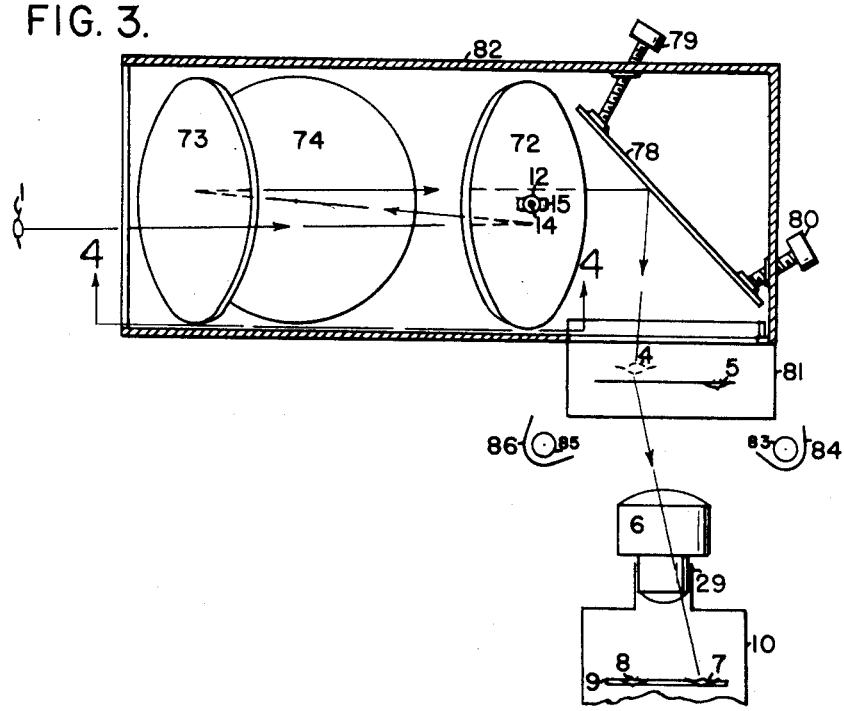
Fig. 3 shows a plan view of an image-erecting embodiment of my system.
Figure 4:
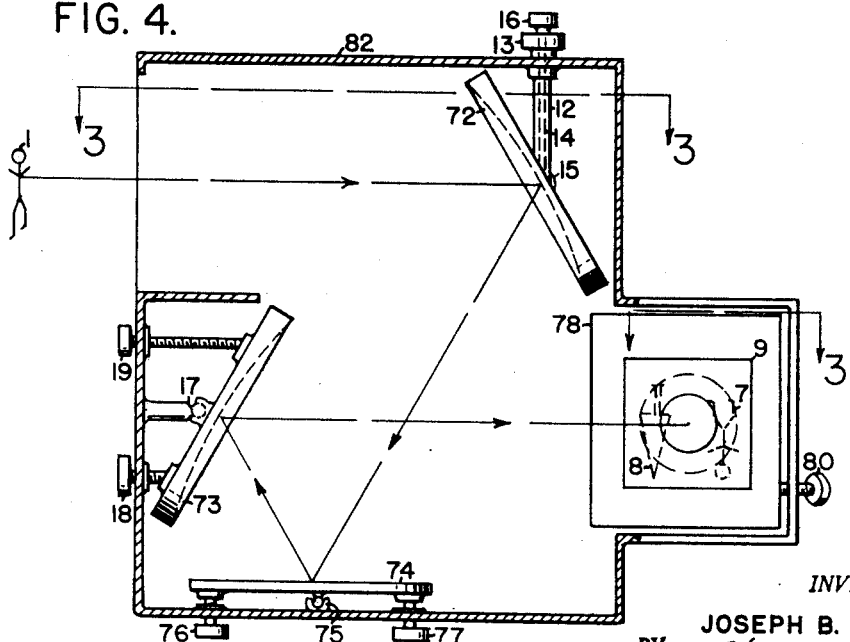
Fig. 4 shows a side elevation of the embodiment of Fig. 3.

Figs. 3 and 4 show an image-erecting embodiment of my system. The principal mirrors 72 and 73 are similar to mirrors 2 and 3 of the preceding figures, although of different inclination and, in general, of longer focal length to correspond to a longer optical path. Mirror 72 is adjustably supported by elements 12 through 16 as has been described in connection with Fig. 1. Mirror 73 is adjustably supported by previously described elements 17, 18 and 19, but with the latter two interchanged in position so that the mirror is inclined downward instead of upward, as was the case in Fig. 1 or 2. Light from the (actor) object 1 impinges upon mirror 72 in the same manner as upon mirror 2 previously. Mirror 72 is further inclined from the vertical, however, and the bundle of rays now pass downward at an angle of the order of 30° from the vertical and impinge upon flat mirror 74, which lies essentially horizontally. This mirror may be provided with adjustments as to inclination, as ball and socket joint 75 and adusting screws 76 and 77, located to give adjustment in two planes. From this mirror the light is reflected to mirror 73 and thence horizontally to another plane mirror 78, standing vertically and at an angle of 45° to the optical path in plan as shown in Fig. 3. This mirror may likewise be made adjustable, as by screws 79 and 80. Located upon a convenient extension 81 of the enclosing housing 82 is the object 5 (tree), this time positioned erectly. Object 5 is suitably illuminated by lamps and reflectors 83 through 86. Image 4 of object 1 occurs in a plane close to that of object 5 and is erect. The two additional reflections from mirrors 74 and 78 turn the image from top to bottom and side for side from that formed by the embodiments of Figs. 1 and 2; mirror 74 accomplishing the former and mirror 78 the latter.

The embodiment of Fig. 3 is shown with the simple objective lens 6 of camera 10 having focus-adjusting means 29 as first shown in Fig. 1. Images 7 and 8 of the objects 1 and 5 are formed as before on sensitive surface 9, but this time inverted as occurs when a camera image is formed of a scene in nature under normal optical conditions. It is important to note that the prior image 4 of object 1 and object 5 are erect in this embodiment, thus a liquid may be contained in a glass, bubbles therein rise and smoke from a lighted cigarette or a chimney in a miniature rise normally, similarly, water flows down hill.

It will be evident to one skilled in the art that my embodiment shown in Figs. 3 and 4 may be modified to embrace the electromechanical automatic control elements of Fig. 2 rather than the manual adjustments of Fig. 1, and that the Electrazoom lens may be employed instead of the simple objective 6. I have also found that the inclinations of all the mirrors in my system, and particularly those of Figs. 3 and 4, may be altered and still give the same or a desirably modified result. For instance, mirror 72 may be farther inclined from the vertical and mirror 74 raised from the horizontal by adjusting screw 77. Mirrors 73 and 74 may be interchanged in position and other changes made in inclination, position and curvature of the mirror surfaces. The latitude of usable focal lengths for the several mirrors is wide. The radius of curvature of mirrors 72 and/or 73 may be increased and that of the flat mirror 74 decreased from infinity to a finite value, as may mirror 73. Furthermore, mirror surface 74 may be made convex in shape and the radius of curvature of the other mirrors decreased. In this way I am able to treat aberrations and second order effects in an effective manner.

In forming aspheric surfaces to control aberrations known methods of local grinding or of altering the thickness of the first-surface reflective coating during vacuum deposit by attention to the placement of the evaporative material may be employed. Also, second surface mirrors with an anti-reflection coating on the first glass surface may be employed and the thick lens formed by the intervening glass utilized to control aberrations.

By means of altering the inclinations of the mirrors and the curvatures thereof it is possible to change the physical form of my device, making it higher and less wide, allowing an oval enclosing shape and so on. The mirror elements need not be round and/or rectangular as these have been shown, but these shapes may be interchanged and oval shapes may be utilized to reduce the size of the device without altering the optical performance thereof. It is only necessary that each mirror be sufficiently large to encompass the extent of the full optical cone at the plane of that element, although additional mirror area is desirable in order to accommodate shifts in the optical axis caused by manipulation of the positioning adjustments. The optical axis has been indicated by dashed arrow lines in the several figures, save Fig. 3, where these lines indicate the path of the principal ray originating at object 1 which is to one side of optical center in this example of actor and tree utilized for illustration.

The mirrors of this compound optical system may be made of a metal such as aluminum or equivalent. A suitable optical surface is obtained by working the metal, by vacuum deposition thereon in addition, by plating or otherwise. Such mirrors provide a light-weight structure in comparison to that resulting when glass is used in such applications where weight is an important factor.

I have given numerical values for several dimensions and characteristics of my system for the purpose of most distinctly teaching how it may be constructed and used. Obviously, my invention is not limited to these values nor to the proportions shown in the accompanying figures. I have explained how numerous variations are possible and this teaching will allow one skilled in the art to considerably depart from the embodiments shown without the necessity of embarking upon further invention.

Having thus fully described my invention and how its practice in preferred forms is to be accomplished, I claim:

1. A compound optical system comprising an enclosure having openings, a concave mirror positioned opposite one said opening to collect light from a field of view containing objects defined by said opening, means to adjust said mirror in elevation, means to adjust said mirror in azimuth, a second mirror within said enclosure positioned nearer to said field of view than said first mirror such that light from said field reflected from said first mirror impinges upon said second mirror, means to adjust said second mirror in elevation and azimuth, said enclosure so formed as to allow said impinged light reflected from said second mirror to pass through a second opening, said mirrors optically constituted to form a real image of the objects of said field of view beyond said second opening, other objects in juxtaposition to said real image, plural lenses coaxially related to form a refractive optical system, said system positioned to include said other objects and said real image in the field of view thereof, an image receiving surface positioned oppositely of said system with respect to the field of view thereof, means to alter the axial position of said lens system with respect to said surface to form a focused image of both said real image and said other objects upon said surface.

2. In combination in a compound optical system, reflective optics for forming a real image of an object, means for adjusting the inclination of said optics for altering the position of said image, a second object, means for adjustably positioning said second object adjacent to said image, a lens of adjustable focal length positioned to collect illumination from said second object and said image, a surface lying on the opposite side of said lens from said object and image and means for altering the axial distance between said lens and said surface for simultaneously focusing real images of both said object and image upon said surface.

3. A compound optical system comprising a mirror, electromechanical means for altering the orientation of said mirror in two dimensions, a second mirror positioned to receive light reflected from said first mirror, said mirrors adapted to form a real image of an object, means for positioning a second object adjacent said real image, electromechanical means for altering the position of said second object in two dimensions, a lens system positioned to collect light from both said real image and said second object, a surface on the side of said lens system opposite to said image and second object, electromechanical means for altering the distance between said lens system and said surface to form an image of said image and second object upon said surface.

4. The system described in claim 3 in which the lens system is of adjustable focal length and electromechanical means coactively connected thereto to adjust the same.

5. A compound optical system comprising an enclosure having openings, a concave mirror positioned opposite one said opening to collect light from a field of view containing objects defined by said opening, electromechanical means for adjusting said mirror in a vertical direction and other electromechanical means for adjusting said mirror in a horizontal direction, a second concave mirror within said enclosure positioned nearer said field of view than said first mirror such that light from said field reflected from said first mirror impinges upon said second mirror, means to adjust said second mirror in two dimensions, said enclosure so formed as to allow said impinged light reflected from said second mirror to pass through a second opening, said mirrors optically constituted to form a real image of the objects of said field of view beyond said second opening, another object optically miscible with said real image, electromechanical means for changing the position of said other object in two dimensions, means for illuminating said other object, a converging lens positioned to include said real image and said other object in the field of view thereof, means to adjust said converging lens oblique to the optical axis defined by said second mirror and said lens, a variable magnification lens having plural lens elements positioned to collect the light passed by said converging lens, electromechanical means for altering the focal length of said variable magnification lens, said converging lens mechanically connected to said means such that it is moved as the magnification of said variable magnification lens is increased, an image receiving surface positioned to receive the light passed by said variable magnification lens, electromechanical means to alter the distance between said surface and said variable magnification lens to form an image of the field of view of said converging lens upon said surface.

6. A compound optical system comprising a first concave mirror oriented to collect light from a field of view, a plane mirror positioned to intercept the light from said field of view reflected from said first mirror, a second concave mirror positioned to intercept the light from said field of view reflected from said plane mirror, a second plane mirror positioned to intercept the light from said field of view reflected from said second concave mirror, means to adjust the angular orientation of each of said mirrors, said system of mirrors forming an erect real image of said field of view having the same sense side to side as said field, an object positioned near said image, means to illuminate said object, a lens system positioned to collect light from both said image and said object, means to adjust the axial position of said lens system, and a focal surface positioned with respect to said lens system to receive therefrom a single combined image of said real image and said object.

7. A compound optical system comprising an enclosure having openings, a concave mirror positioned opposite one said opening to collect light from a field of view containing objects entering through said opening, means for adjusting said mirror in vertical and horizontal directions, a second mirror positioned below said concave mirror within said enclosure such that light from said field reflected from said concave mirror impinges upon said second mirror, a third mirror positioned above and closer to said field of view within said enclosure than said second mirror such that light from said field reflected from said second mirror impinges upon said third mirror and is reflected in a direction approximately parallel to the light that passed from said field of view to said concave mirror, a forth mirror positioned at an angle in the horizontal plane with respect to said third mirror and so as to receive light from said field reflected from said third mirror, said enclosure so formed as to allow said received light reflected by said fourth mirror to pass through a second opening, said mirrors optically constituted to form an erect real image correctly sensed side to side of said field of view, an erect other object positioned optically miscible with said real image, means to illuminate said other object, a converging lens positioned to receive light from both said real image and said other object, a surface on the side of said lens opposite to said other object and means to alter the distance between said surface and said lens to focus an inverted image of said real image and said other object upon said surface.

References Cited in the file of this patent

UNITED STATES PATENTS

| Number | Name | Date |
|---|---|---|
| 1,053,650 | Saalburg | Feb. 18, 1913 |
| 1,133,311 | Newcomb | Mar. 30, 1915 |
| 1,156,896 | Garrette | Oct. 19, 1915 |
| 1,216,835 | Morris | Feb. 20, 1917 |
| 1,552,451 | Roach | Sept. 8, 1925 |
| 1,699,689 | Curry | Jan. 22, 1929 |
| 1,945,926 | Tolhurst | Feb. 6, 1934 |
| 2,334,962 | Seitz | Nov. 23, 1943 |
| 2,532,685 | Walker | Dec. 5, 1950 |
| 2,628,533 | Oetjen | Feb. 17, 1953 |